United States Patent
Kitaguchi

(10) Patent No.: US 11,120,787 B2
(45) Date of Patent: Sep. 14, 2021

(54) JOB RECORD SPECIFYING DEVICE, IMAGE PROCESSING APPARATUS, SERVER, JOB RECORD SPECIFYING METHOD, AND RECORDING MEDIUM

(71) Applicant: KONICA MINOLTA, INC., Tokyo (JP)

(72) Inventor: Tatsuya Kitaguchi, Fussa (JP)

(73) Assignee: Konica Minolta, Inc., Tokyo ( * ) Notice: Subject to any disclaimer, the term of this patent is extended or adjusted under 35 U.S.C. 154(b) by 91 days.

(21) Appl. No.: 16/415,264

(22) Filed: May 17, 2019

(65) Prior Publication Data
US 2019/0362708 A1 Nov. 28, 2019

(30) Foreign Application Priority Data

May 23, 2018 (JP) .................... JP2018-98566

(51) Int. Cl.
| | | |
|---|---|---|
| G10L 15/22 | (2006.01) | |
| G10L 15/05 | (2013.01) | |
| G10L 15/26 | (2006.01) | |
| G10L 15/08 | (2006.01) | |
| H04N 1/32 | (2006.01) | |

(52) U.S. Cl.
CPC .............. G10L 15/05 (2013.01); G10L 15/22 (2013.01); G10L 15/26 (2013.01);
(Continued)

(58) Field of Classification Search
CPC ..... G10L 13/00; G10L 15/1815; G10L 15/22; G10L 15/26; G10L 13/02; G10L 13/08;
(Continued)

(56) References Cited

U.S. PATENT DOCUMENTS 5,812,882 A * 9/1998 Raji ................. G06F 16/289
710/72
8,264,713 B2 * 9/2012 Takeuchi ........... H04N 1/32358
358/1.15

(Continued)

FOREIGN PATENT DOCUMENTS

| CN | 107678629 A | 2/2018 |
|---|---|---|
| JP | 2010044432 A | 2/2010 |
| JP | 2014013962 A | 1/2014 |

OTHER PUBLICATIONS

Office Action issued in corresponding Chinese Patent Application No. 201910420987.5, dated Jul. 6, 2021, with English Translation (43 pages).

*Primary Examiner* — Vijay B Chawan
(74) *Attorney, Agent, or Firm* — Buchanan Ingersoll & Rooney PC

(57) ABSTRACT

A user inputs a speech including a keyword via a speech input device; a first processor searches a job history by the keyword, the job history being stored on a storage, the job history including a job record, the job record including a set of values having ever been used for a job executed by an image processing apparatus. A job record specifying device includes a second processor that conducts an analysis on different values in multiple job records; selects a speech with reference to the different values; transfers the speech to a speech generator; and finds a specific job record from the multiple job records using a keyword extracted from a speech inputted via the speech input device in response to the speech outputted by the speech generator. The image processing apparatus reflects a target set of values in the specific job record, to the setting of a job.

27 Claims, 12 Drawing Sheets

(52) U.S. Cl.
CPC .... *G10L 2015/088* (2013.01); *H04N 1/32358* (2013.01); *H04N 2201/0094* (2013.01)

(58) Field of Classification Search
CPC ..... G10L 15/02; G10L 15/18; G10L 15/1822; G10L 15/183; G10L 15/30; G10L 2015/223; G10L 21/06; G10L 25/66; G10L 2015/088; G10L 15/05; H04N 2201/0094; H04N 1/32358; H04N 1/32416; H04N 1/00127; H04N 1/00344; H04N 1/0035; H04N 1/00941; H04N 1/00952; H04N 1/00973; H04N 1/32122; H04N 2201/3202; H04N 2201/3288; H04N 2201/33314; G06F 40/279; G06F 40/30; G06F 40/40; H04L 63/08; H04L 63/0876; H04L 67/1044; H04L 67/1095; H04L 67/125; H04L 67/2823; G06K 9/00302; H04M 1/72547; H04M 1/72597; Y10S 707/99933
USPC ................. 358/1.15, 1.1, 1.9; 709/205, 224; 710/72; 714/50
See application file for complete search history.

(56) References Cited

U.S. PATENT DOCUMENTS

| | | | | |
|---|---|---|---|---|
| 8,336,078 | B2* | 12/2012 | Dixit | G06F 21/604 726/1 |
| 8,982,377 | B2* | 3/2015 | Uchibori | H04N 1/00127 358/1.14 |
| 9,094,541 | B2* | 7/2015 | Jeong | G06F 11/3476 |
| 9,189,187 | B2* | 11/2015 | Naitoh | G06F 3/1238 |
| 9,608,972 | B2* | 3/2017 | Takeuchi | H04L 63/0876 |
| 10,354,209 | B2* | 7/2019 | Kondoh | G06Q 10/06 |
| 10,558,370 | B2* | 2/2020 | Okayama | G06F 12/0868 |
| 10,791,176 | B2* | 9/2020 | Phipps | G10L 15/22 |
| 2005/0206973 | A1* | 9/2005 | Shoji | H04N 1/40 358/500 |
| 2005/0275886 | A1* | 12/2005 | Takeuchi | H04N 1/32358 358/1.15 |
| 2006/0085697 | A1* | 4/2006 | Takeuchi | H04N 1/00344 714/50 |
| 2006/0149835 | A1* | 7/2006 | Odaira | H04N 1/32112 709/224 |
| 2007/0279425 | A1* | 12/2007 | Katahira | G06F 12/023 345/543 |
| 2008/0204768 | A1* | 8/2008 | Ikuno | H04N 1/00952 358/1.1 |
| 2014/0085659 | A1* | 3/2014 | Jeong | G06F 11/3476 358/1.14 |
| 2015/0193431 | A1* | 7/2015 | Stoytchev | G16B 20/00 704/9 |
| 2015/0264129 | A1* | 9/2015 | Takeuchi | H04N 1/0035 709/205 |
| 2015/0370847 | A1* | 12/2015 | Kondoh | G06F 17/40 707/691 |
| 2017/0178626 | A1* | 6/2017 | Gruber | H04M 1/72563 |
| 2018/0330302 | A1* | 11/2018 | Peterson | G10L 25/66 |

* cited by examiner

V51

"Print file A from storage X using the setting used at about 17:00, yesterday."

AAA

V52

"Which was the option for pages per sheet?"

190

T7

| Job Record | Date Time | Paper Size | Color | Single-sided/duplex | Puncher | Nin |
|---|---|---|---|---|---|---|
| 1 | 16:50 | A3 | Color | Single-sided | ON | 1in1 |
| 2 | 16:55 | A5 | Single-color (Cyan) | Duplex | OFF | 4in1 |
| 3 | 17:00 | A3 | Double-color (Black + Yellow) | Single-sided | ON | Nin1 |
| 4 | 17:03 | A5 | Monochrome | Duplex | OFF | 4in1 |
| 5 | 17:08 | A4 | Color | Duplex | OFF | 8in1 |
| Number of different values | | 3 | ④ | 2 | 2 | ④ |

T8

| Function | Priority (Lower numbers represent higher priority) |
|---|---|
| Paper Size | 5 |
| Color | 3 |
| Single-sided/duplex | 7 |
| Puncher | 6 |
| Nin1 | ② |
| Density | 10 |

Priority Table

Color and pages per sheet both have the greatest number of different values and pages per sheet has a higher priority than color; determine to ask about pages per sheet.

FIG. 7

JOB RECORD SPECIFYING DEVICE, IMAGE PROCESSING APPARATUS, SERVER, JOB RECORD SPECIFYING METHOD, AND RECORDING MEDIUM

The disclosure of Japanese Patent Application No. 2018-098566 filed on May 23, 2018, including description, claims, drawings, and abstract, is incorporated herein by reference in its entirety.

BACKGROUND

Technological Field

The present invention relates to: a job record specifying device; an image processing apparatus that performs: searching a job history using a user speech input; finding a specific job record having a target set of values of the user out of multiple job records; and reflecting the target set of values to the setting of a job to be executed by the image processing apparatus; a server; a job record specifying method; and a recording medium.

Description of the Related Art

Conventional multifunctional digital machines referred to as multifunction peripherals (MFP) are image processing apparatuses, for example. Such an image processing apparatus allows the user to configure the setting of a job by a simple method. Specifically, sets of values regularly used for the setting of a job are recorded in a program, and the image processing apparatus allows the user to get it done quickly only by calling a target set of value by record number, consequently leading to the reduction of human errors and the saving of time and effort.

Similarly, sets of values having ever been used for the setting of a job are recorded in a job history, and the image processing apparatus allows the user to get it done quickly only by selecting a desirable set of values from the job history (as suggested by Japanese Unexamined Patent Application Publications No. 2010-044432 and No. 2014-013962, for example).

It is pretty common that the user operates an operation panel to call a target set of values or select a desirable set of values.

In recent years, some conventional image processing apparatuses allow the user to operate by speech from a speech terminal device that does not provide any visual information. Such an image processing apparatus allows the user to configure the setting of a job by speech using a job history, which means it must be configured to search a job history for a specific job record having a target set of values of the user. For example, the image processing apparatus may be configured to search a job history by a keyword (for example, a date and time) included in a user speech input and outputs a result of search by speech for the user to confirm the setting aurally. Obtaining multiple job records by keyword search, in this case, the image processing apparatus needs to narrow them down.

According to a job history table T10 in FIG. 12, there are print jobs Nos. 1 to 5 which were, respectively, executed at 16:50, 16:55, 17:00, 17:03, and 17:08, yesterday, by the image processing apparatus. When a user AAA inputs a speech V61 "print file A from storage X using the setting used at about 17:00, yesterday", the image processing apparatus obtains the five job records by keyword search. The image processing apparatus then needs to find a specific job record having a target set of values of the user AAA out of the five job records.

In a conventional technique for that, as illustrated in FIG. 12, the image processing apparatus requests the user to check the job records including the values "17:00", "17:03", "16:55", "17:08", and "16:50", in the order from closest to farthest to and from 17:00, the user specified time. In other words, the image processing apparatus outputs speeches V62, V64, V66, and V68 in this order. Receiving user speech inputs V63, V65, V67, and V69 in response to the speeches, the image processing apparatus finds a specific job record having a target set of values. In another conventional technique for that, as illustrated in FIG. 13, the image processing apparatus requests the user to input target values for color, pages per sheet, and other functions. In other words, the image processing apparatus outputs speeches V82, V84, V86, and V88 in this order. Receiving user speech inputs V83, V85, V87, and V89 in response to the speeches, the image processing apparatus finds a specific job record having a target set of values.

In these conventional methods for narrowing down a search, the image processing apparatus finds a specific job record having a target set of values of the user by communicating back and forth with the user and the speech terminal device, which takes time and is inconvenient.

SUMMARY

The present invention, which has been made in consideration of such a technical background as described above is capable of: searching a job history using a user speech input; quickly finding a specific job record having a target set of values of the user out of multiple job records; and reflecting the target set of values of the user to the setting of a job.

A first aspect of the present invention relates to a job record specifying device, wherein:

a user inputs a speech including a keyword via a speech input device; and a first processor searches a job history by the keyword, the job history being stored on a storage, the job history including a job record, the job record including a set of values having ever been used for a job executed by an image processing apparatus, the job record specifying device including a second processor that performs:

conducting an analysis on different values in multiple job records when the first processor obtains the multiple job records by search;

selecting a speech for narrowing down the search with reference to the different values and transferring the selected speech to a speech generator; and finding a specific job record from the multiple job records using a keyword extracted from a speech being inputted by the user via the speech input device in response to the speech outputted by the speech generator, the specific job record including a target set of values of the user, wherein the image processing apparatus reflects the target set of values to the setting of a job, the target set of values being included in the specific job record found by the second processor.

A second aspect of the present invention relates to a job record specifying method wherein a user inputs a speech including a keyword via a speech input device, the job record specifying method including:

searching a job history by the keyword, the job history being stored on a storage, the job history including a job record, the job record including a set of values having ever been used for a job executed by an image processing apparatus;

conducting an analysis on different values in multiple job records when the multiple job records are obtained by search;

selecting a speech for narrowing down the search with reference to the different values and transferring the selected speech to a speech generator; and finding a specific job record from the multiple job records using a keyword extracted from a speech being inputted by the user via the speech input device in response to the speech outputted by the speech generator, the specific job record including a target set of values of the user, wherein the image processing apparatus reflects the target set of values to the setting of a job, the target set of values being included in the specific job record.

A third aspect of the present invention relates to a non-transitory computer-readable recording medium storing a program for an execution by a job record specifying device, wherein a user inputs a speech including a keyword via a speech input device; and a job history is searched by the keyword, the job history being stored on a storage, the job history including a job record, the job record including a set of values having ever been used for a job executed by an image processing apparatus, the program to make a processor of the job record specifying device execute:

conducting an analysis on different values in multiple job records when the multiple job records are obtained by search;

selecting a speech for narrowing down the search with reference to the different values and transferring the selected speech to a speech generator; and finding a specific job record from the multiple job records using a keyword extracted from a speech being inputted by the user via the speech input device in response to the speech outputted by the speech generator, the specific job record including a target set of values of the user, wherein the image processing apparatus reflects the target set of values to the setting of a job, the target set of values being included in the specific job record.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a view for reference in describing an example 6 of a job history search operation of the image processing apparatus.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

In this embodiment, an image processing apparatus is provided with a job record specifying device as one of its functions.

Figure 1:
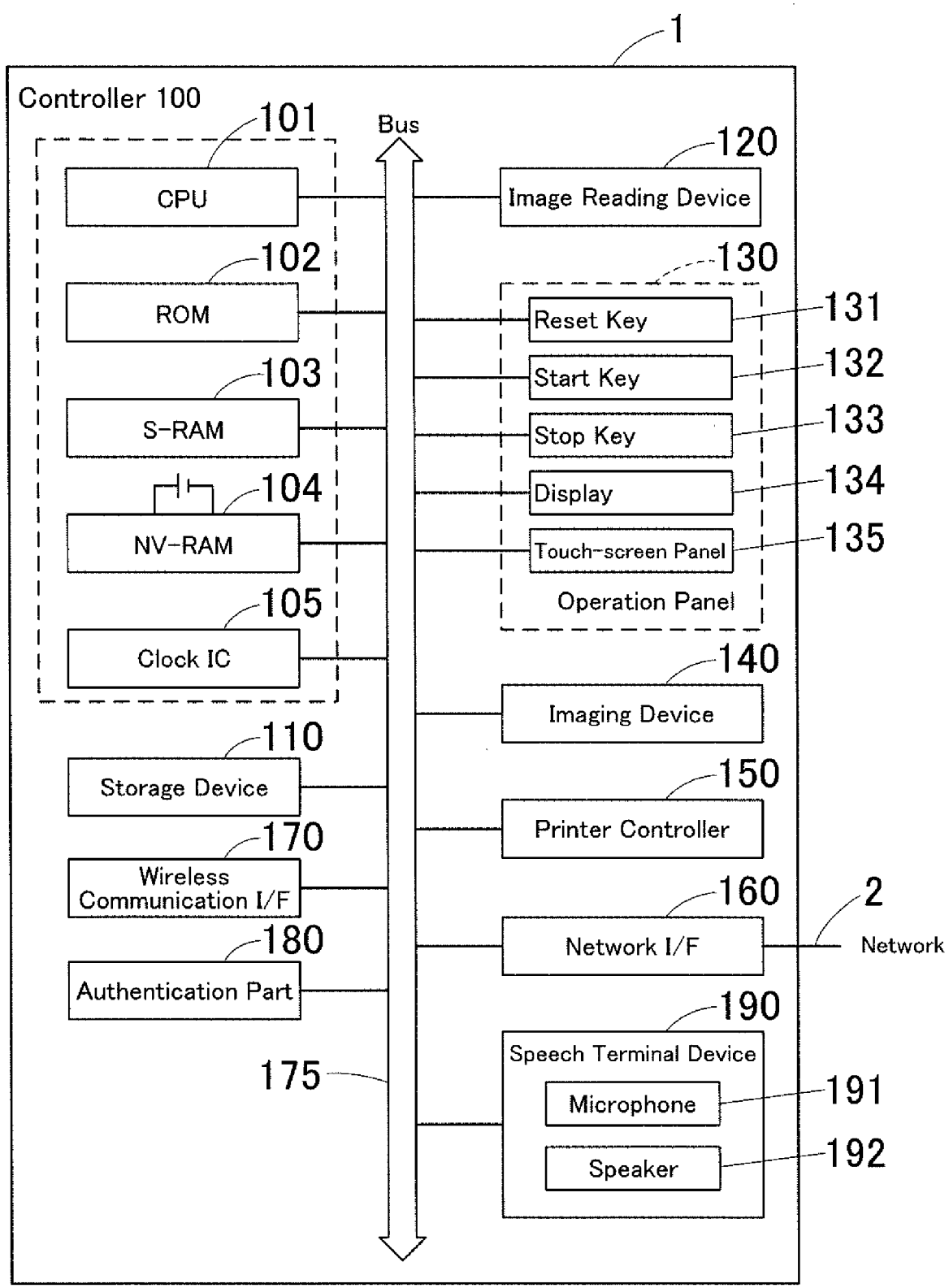
FIG. 1 is a block diagram illustrating an image processing apparatus which is provided with a job record specifying device according to one embodiment of the present invention.

FIG. 1 is a block diagram illustrating an image processing apparatus which is provided with a job record specifying device according to one embodiment of the present invention as one of its functions. In this embodiment, an MFP i.e. a multi-functional digital image forming apparatus having various functions such as a copier function, a printer function, a scanner function, and a facsimile function, as described above, is employed as an image forming apparatus 1. Hereinafter, an image forming apparatus will be also referred to as "MFP".

As illustrated in FIG. 1, the MFP 1 is essentially provided with: a controller 100; a fixed storage device 110; an image reading device 120; an operation panel 130; an imaging device 140; a printer controller 150; a network interface (network I/F) 160; a wireless communication interface (wireless communication I/F) 170; an authentication portion 180; and a speech terminal device 190, all of which are connected to each other through a system bus 175.

The controller 100 is essentially provided with: a central processing unit (CPU) 101; a read-only memory (ROM) 102; a static random-access memory (S-RAM) 103; a non-volatile random-access memory (NV-RAM) 104; and a clock IC 105.

The CPU 101 controls the MFP 1 in a unified and systematic manner by executing programs stored on a recording medium such as the ROM 102. Specifically, the CPU 101 controls the MFP 1 in such a manner that allows the MFP 1 to execute its copier, printer, scanner, facsimile, and other functions successfully. Furthermore, in this embodiment, the CPU 101 performs: receiving a user speech input from the speech terminal device 190; converting the user speech input to text form; extracting keywords from the text; and searching a job history by the keyword. Obtaining multiple job records by search, the CPU 101 finds a specific job record having a target set of values of the user out of the multiple job records. These operations will be later described more in detail.

The ROM 102 stores programs to be executed by the CPU 101 and other data.

The S-RAM 103 serves as a workspace for the CPU 101 to execute a program and essentially stores a program and data to be used by the program for a short time.

The NV-RAM 104 is a battery backed-up non-volatile memory and essentially stores various settings related to image forming.

The clock IC 105 indicates time and also serves as an internal timer to measure an execution time, for example.

The storage device 110 is a hard disk drive, for example, and stores programs and other data of various types. Specifically, in this embodiment, other data of various types includes a job history that records copy jobs, print jobs, scan jobs, and other jobs all having ever been executed or having been executed for the most recent period of time. Each job record includes the name of the user who generated the job and a set of values used for the job, and is associated with image data or print data used for the job, and other information.

Upon completion of an execution of the job, a job record may be stored on an external storage such as a management server, instead of the storage device 110. At this time, image data or print data used for the job and other information may be also stored on the same. In this case, the management server can be configured to collect job histories from multiple MFP 1 and store them for later use.

The image reading device 120 is essentially provided with a scanner. The image reading device 120 obtains an image by scanning a document put on a platen and converts the obtained image to an image data format.

The operation panel 130 allows the user to give a job and instructions to the MFP 1 and configure the setting of various functions of the MFP 1. The operation panel 130 is essentially provided with: a reset key 131; a start key 132; a stop key 133; a display 134; and a touch-screen panel 135.

The reset key 131 allows the user to reset the settings. The start key 132 allows the user to start operation, for example, start scanning. The stop key 133 allows the user to stop operation.

The display 134 consists of a liquid-crystal display device, for example, and displays messages, various operation screens, and other information. The touch-screen panel 135 is mounted on the surface of the display 134 and detects user touch events.

The imaging device 140 makes a physical copy by printing on paper image data obtained from a document by the image reading device 120 and an image formed on the basis of print data received from a terminal apparatus 4.

The printer controller 150 forms an image on the basis of print data received by the network interface 160.

The network interface 160 serves as a transmitter-receiver means that exchanges data with a server and other external apparatuses through a network 2. The wireless communication interface 170 is an interface to communicate with external apparatuses using near-field wireless communication technology.

The authentication part 180 obtains identification information of a user trying to log on and performs authentication by comparing the identification information to proof information stored on a recording medium such as the storage device 110. Instead of the authentication part 180, an external authentication server may compare the identification information to the proof information. In this case, the authentication part 180 performs authentication by receiving a result of the authentication from the authentication server. The user may input his/her identification information by speech. Instead of identification information, the user may input a speech for speaker recognition.

The speech terminal device 190 is provided with: a microphone 191 serving as a speech input device; and a speaker 192 serving as a speech output device (speech generator). The microphone 191 converts a user speech input to audio form. The speaker 192 receives audio data from the controller 100 and outputs it (generates a speech). The speech terminal device 190 may be provided as a part of the MFP 1; in this case, it may be thus provided such that it is removable from the MFP 1.

In this embodiment, the user can configure the setting of a job by speech using a job history before starting the job. Hereinafter, the operation of the MFP 1, which starts when the user inputs a speech via the microphone 191 of the speech terminal device 190, will be described.

Concrete Example 1

Figure 2:
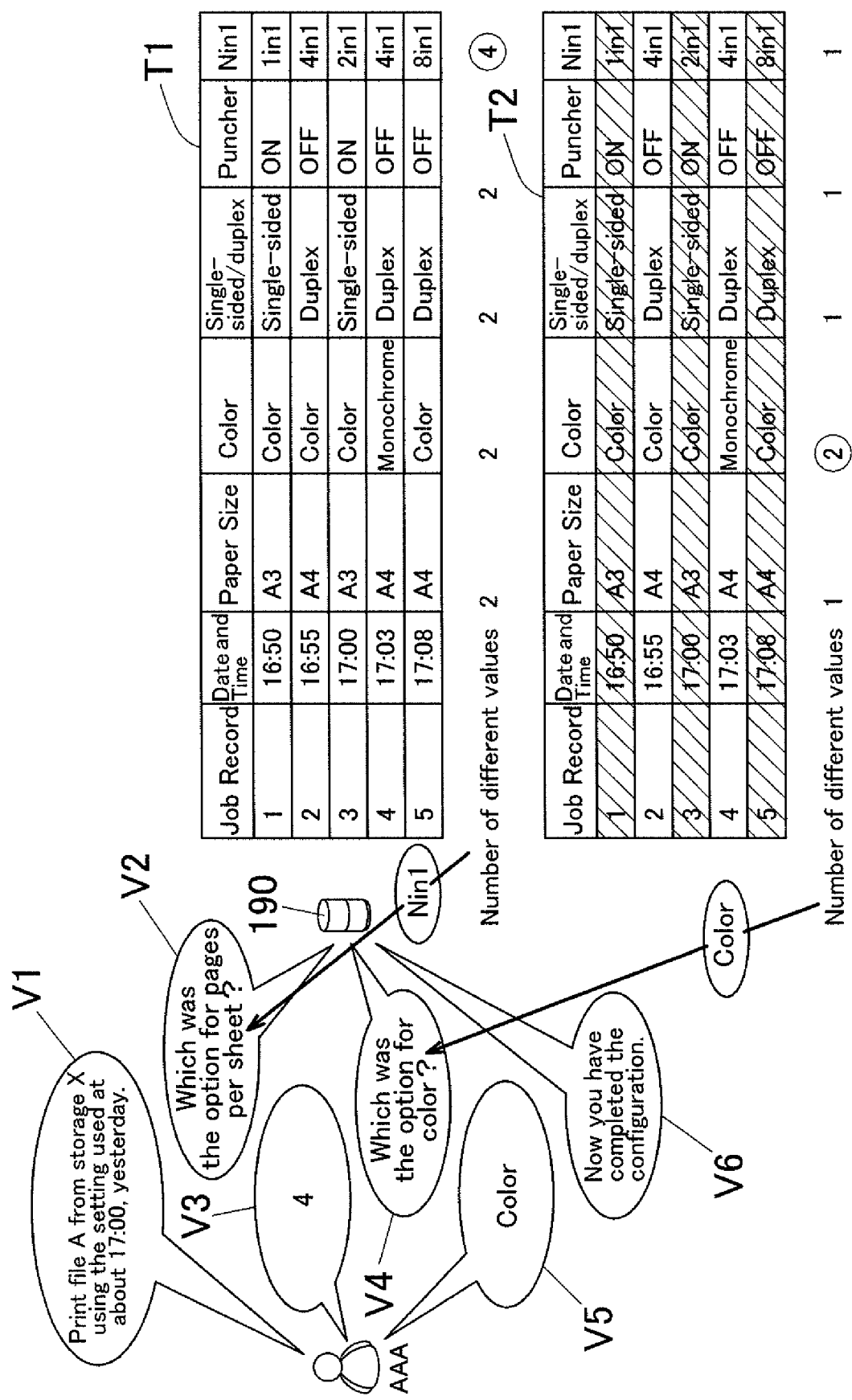
FIG. 2 is a view for reference in describing an example 1 of a job history search operation of the image processing apparatus.

Referring to FIG. 2, the user AAA inputs a speech V1 "print file A from storage X using the setting used at about 17:00, yesterday". Then the microphone 191 of the speech terminal device 190 converts the user speech input to audio form and transfers it to the controller 100. The controller 100, as instructed by the CPU 101, converts the audio data to text form and extracts keywords (search words) from the text. In this example, the controller 100 extracts the keywords "storage X", "file A", "yesterday", "17:00", "at about", "setting", and "print".

Subsequently, the controller 100 selects only the keywords "yesterday", "17:00", "about", "setting", and "print" relating to job setting out of the extracted keywords and searches a job history stored on the storage device 110, by these keywords. "At about" and "at around" are keywords to mean that the time is not exact. So, the controller 100 searches the job history for a job record including a time within a predetermined period near 17:00, for example, a time within one hour before and after 17:00.

The job history may be stored on an external storage such as a management server. In this case, the MFP 1 transfers the keywords to the management server; the management server receives the keywords, searches the job history by the keywords, obtains job records, and transfers a notice of the job records to the MFP 1. Alternatively, the MFP 1 may transfer all job records to the management server previously, obtain a job history from the management server, and search the job history.

In this example, the controller 100 conducts a search and obtains the job records Nos. 1 to 5 including date and times from 16:50 to 17:08, yesterday, as shown in Table T1 of FIG. 2. Each job record has a set of values for paper size, color, single-sided/duplex, puncher, and pages per sheet that is N-up.

Subsequently, the controller 100 analyzes the five job records and obtains a result of the analysis. In this example, a result of the analysis is the number of different values for each function. For example, the job records Nos. 1 and 3 have the value "A3" and the other job records have the value "A4" for paper size. This means there are two different values for paper size: "A3" and "A4". Similarly, there are two different values for color: "color" and "monochrome"; there are two different values for single-sided/duplex: "single-sided" and "duplex"; and there are two different values for puncher: "ON" and "OFF". Furthermore, there are four different values for pages per sheet: "1 in 1", "2 in 1", "4 in 1", and "8 in 1". The number of different values for each function is given under Table T1 of FIG. 2.

Subsequently, in order to find a specific job record having a target set of values of the user AAA, the controller 100 selects a speech. In this embodiment, the controller 100 determines to request the user AAA to input a target value for the function having the greatest number of different values. Referring to Table T1 of FIG. 2, the number of different values for pages per sheet is four and it is the greatest number among the functions. So, the controller 100 determines to request the user AAA to input a target value for pages per sheet and selects a speech V2 "which was the option for pages per sheet?".

In the manner described above, the controller 100 requests the user AAA to input a target value for the function having the greatest number of different values, and obtains as less job records as possible out of the job records. That is, the controller 100 is allowed to quickly find a specific job record having a target set of values of the user.

The controller 100 transfers the selected speech in audio form to the speech terminal device 190, and the speaker 192 of the speech terminal device 190 outputs the speech V2, "which was the option for pages per sheet?".

In response to the speech, the user AAA inputs a target value by speech. The user AAA inputs a speech V3, "4", for example. Then the microphone 191 of the speech terminal device 190 converts the user speech input to audio form and transfers it to the controller 100. The controller 100, as instructed by the CPU 101, converts the audio data to text form and extracts keywords from the text. In this embodiment, the controller 100 obtains the keyword "4" and thus confirms that the target value for pages per sheet is "4 in 1".

The controller 100 searches the job history, Table T1 of FIG. 2, for a job record having the value "4 in 1" for pages per sheet. As shown in Table T2 of FIG. 2, the controller 100 obtains two job records, the job records Nos. 2 and 4. In Table T2 of FIG. 2, the other three job records are hidden with hatching because they are now excluded from the search.

Subsequently, the controller 100 analyzes the two job records and obtains the number of different values for each function. The job records Nos. 2 and 4 have the value "A4" for paper size, which means there is one different value for the function. Similarly, there are two different values for color: "color" and "black and white"; there is one value for single-sided/duplex: "duplex"; and there is one value for puncher: "OFF". The number of different values for each function is given under Table T2 of FIG. 2.

Subsequently, in order to find a specific job record having a target set of values of the user AAA, the controller 100 determines to request the user AAA to input a target value for color that is a function having the greatest number of different values, and selects a speech V4 "which was the option for color?". The controller 100 transfers the selected speech in audio form to the speech terminal device 190, and the speaker 192 of the speech terminal device 190 outputs the speech V4 "which was the option for color?".

In response to the speech, the user AAA inputs a speech V5 "color", for example, via the microphone 191 of the speech terminal device 190. Then the microphone 191 converts the user speech input to audio form and transfers it to the controller 100. The controller 100, as instructed by the CPU 101, converts the audio data to text form and extracts the keyword "color" from the text, and thus confirms that the target value for color is "color".

Since only the job record No. 2 has the value "color", the controller 100 judges the job record No. 2 as a specific job record having a target set of values of the user AAA. Furthermore, the controller 100 reflects the target set of values included in the job record No. 2 to the setting of a print job, and the speaker 192 outputs a speech V6 "now you have completed the configuration".

The user AAA can input a target function and value by speech to change the setting of any of the functions. When the user AAA inputs a speech to start the job, the controller 100 obtains the file A from the user specified storage and starts an execution of the print job in accordance with the configuration.

As described above, in this embodiment, the MFP 1 extracts keywords from a user speech input and searches a job history by the keywords. Obtaining multiple job records by search, the MFP 1 analyzes the job records, obtains the number of different values for each function, and requests the user AAA to input a target value for the function having the greatest number of different values. By repeating this operation, the MFP 1 is allowed to find one specific job record having a target set of values of the user, which makes a job history search more quicker than ever.

In a conventional technique, the MFP 1 requests the user AAA to check the job records Nos. 3, 4, and 2 in the order from closest to farthest to and from 17:00, and thus receives a user speech input three times to find the job record No. 2. In another conventional technique, the MFP 1 requests the user AAA to input target values for the functions such as paper size, color, and single-sided/duplex, and thus receives a user speech input three or more times to find the job record No. 2.

In contrast, in this embodiment, the MFP 1 receives a user speech input only two times to find the job record No. 2, which makes a job history search quicker.

The MFP 1 may obtain one job record by conducting a search by a keyword extracted from a user speech input. In this case, the MFP 1 reflects a set of values of the one job record to the setting of a job without selecting and outputting a speech for narrowing down the search.

The MFP 1 may obtain multiple job records having the same set of values by keyword search. In this case, the MFP 1 reflects the same set of values to the setting of a job without selecting and outputting a speech for narrowing down the search.

Concrete Example 2

In this example, the MFP 1 is configured to analyze multiple job records, find a value that can uniquely define a specific job record, and request the user to input such a value.

Figure 3:
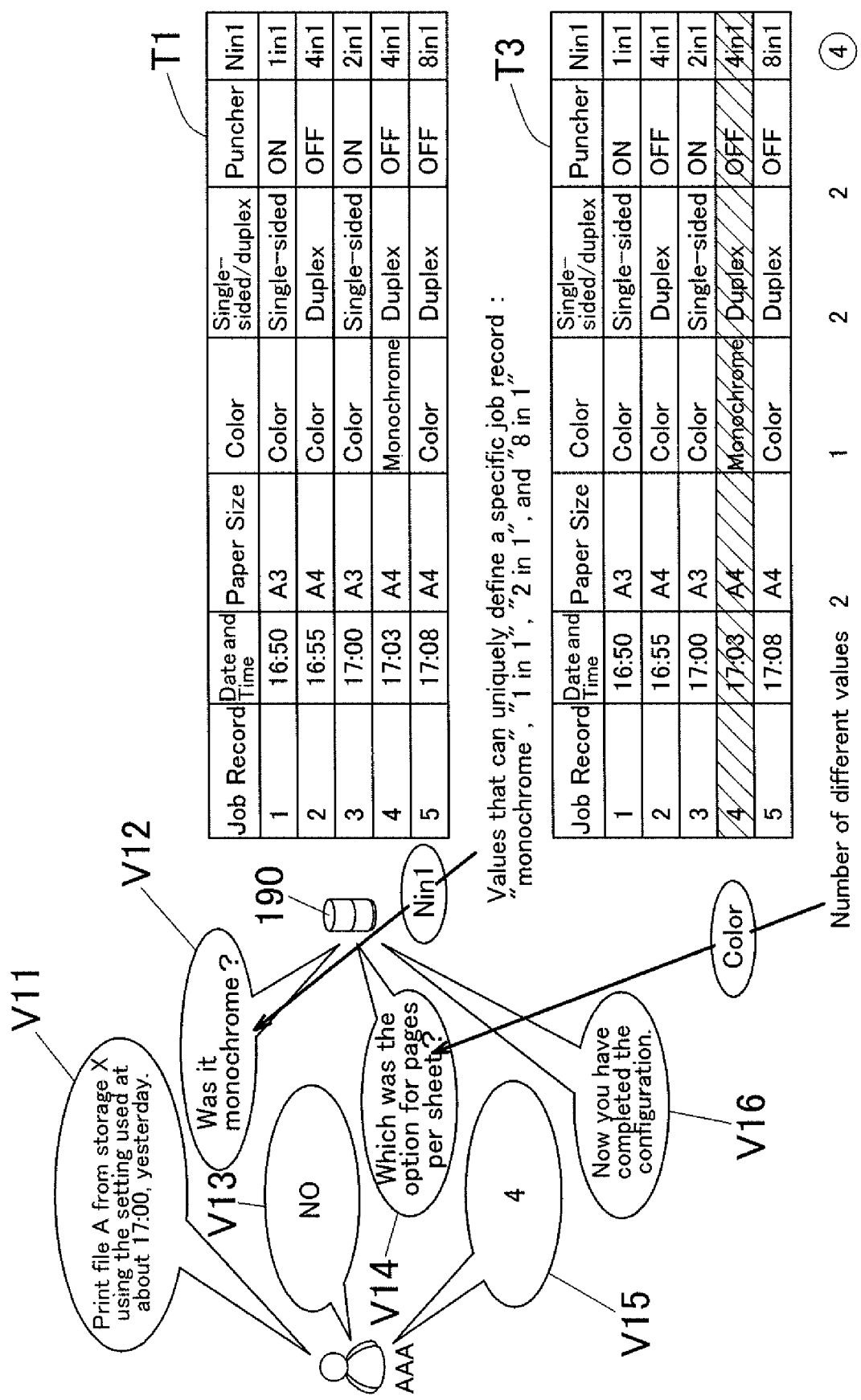
FIG. 3 is a view for reference in describing an example 2 of a job history search operation of the image processing apparatus.

Referring to FIG. 3, the user AAA inputs a speech V11, "print file A from storage X using the setting used at about 17:00, yesterday" in the same manner as he/she does in the concrete example 1. Then the microphone 191 of the speech terminal device 190 converts the user speech input to audio form and transfers it to the controller 100. The controller 100, as instructed by the CPU 101, converts the audio data to text form and extracts keywords from the text. In this example, the controller 100 extracts the keywords "storage X", "file A", "yesterday", "17:00", "at about", "setting", and "print".

The controller 100 searches a job history by these keywords and obtains the job records Nos. 1 to 5, as shown in Table T1 of FIG. 3.

Subsequently, the controller 100 analyzes the five job records and obtains a result of the analysis. In this example, the result of the analysis is a value that can uniquely define a specific job record. For example, only the job record No. 4 has the value "monochrome" for color, which means the value "monochrome" is a value that can uniquely define the job record No. 4. Similarly, the value "1 in 1" for pages per sheet is a value that can uniquely define the job record No. 1; the value "2 in 1" for pages per sheet is a value that can uniquely define the job record No. 3; and the value "8 in 1" for pages per sheet is a value that can uniquely define the job record No. 5.

Subsequently, in order to find a specific job record having a target set of values of the user AAA out of the job records, the controller 100 determines to ask whether the value "monochrome", which is the value that can uniquely define a specific job record, is a target value, and selects a speech V12 "was it monochrome?".

The controller 100 transfers the selected speech in audio form to the speech terminal device 190, and the speaker 192 of the speech terminal device 190 outputs the speech V12 "was it monochrome?".

If the target value for color is "monochrome", the user AAA inputs a speech such as "yes" in response as a positive answer. Then the controller 100 of the MFP 1 finds the job record No. 4 including the target value "monochrome". Furthermore, the controller 100 reflects the target set of values included in the job record No. 4 to the setting of a job.

If the target value for color is not "monochrome", the user AAA inputs a speech such as "no" in response as a negative answer. Then the microphone 191 of the speech terminal device 190 converts the user speech input to audio form and transfers it to the controller 100. The controller 100, as instructed by the CPU 101, converts the audio data to text form and extracts the keyword "no" from the text, and thus confirms that the target value for color is not "monochrome". So, the controller 100 excludes the job record No. 4 to narrow down the search to the other four job records, the job records Nos. 1 to 3 and 5. Table T3 of FIG. 3 shows the situation. The job record No. 4 is hidden with hatching because it is now excluded from the search.

Subsequently, the controller 100 continues its operation in a similar manner to the concrete example 1. That is, the controller 100 analyzes the four job records and obtains the number of different values for each function. The number of different values for each function is given under Table T3 of FIG. 3.

In this example, the number of different values for pages per sheet is four and it is the greatest number among the functions. So, the controller 100 determines to request the user AAA to input a target value for pages per sheet. Specifically, the controller 100 selects a speech V14, "which was the option for pages per sheet?". The controller 100 transfers the selected speech in audio form to the speech terminal device 190. The speaker 192 of the speech terminal device 190 outputs the speech V14, "which was the option for pages per sheet?".

In response, the user AAA inputs a target value for pages per sheet, for example, a speech V15 "4". Then the microphone 191 converts the user speech input to audio form and transfers it to the controller 100. The controller 100, as instructed by the CPU 101, converts the audio data to text form and extracts the keyword "4" from the text, and thus confirms that the target value for pages per sheet is "4 in 1".

Since only the job record No. 2 has the value "4 in 1", the controller 100 judges the job record No. 2 as a specific job record having a target set of values of the user AAA.

Furthermore, the controller 100 reflects the target set of values included in the job record No. 2 to the setting of a job, and the speaker 192 outputs a speech V16 "now you have completed the configuration".

When the user AAA inputs a speech to start the job, the controller 100 obtains the file A from the user specified storage and starts an execution of a print job in accordance with the configuration.

As described above, in this example, the MFP 1 asks the user whether a value that can uniquely define a specific job record is a target value and receives a user speech input only one time to find it. The MFP 1 is thus allowed to quickly find a specific job record having a target set of values of the user. Even when the user may answer that it is not a target value, the MFP 1 further requests the user to input a target value for the function having the greatest number of different values. With this configuration, the MFP 1 is allowed to quickly find a specific job record having a target set of values of the user.

Concrete Example 3

In this example, the MFP 1 extracts keywords from a user speech input and searches a job history by the keywords, but does not obtain any job record.

Figure 4:
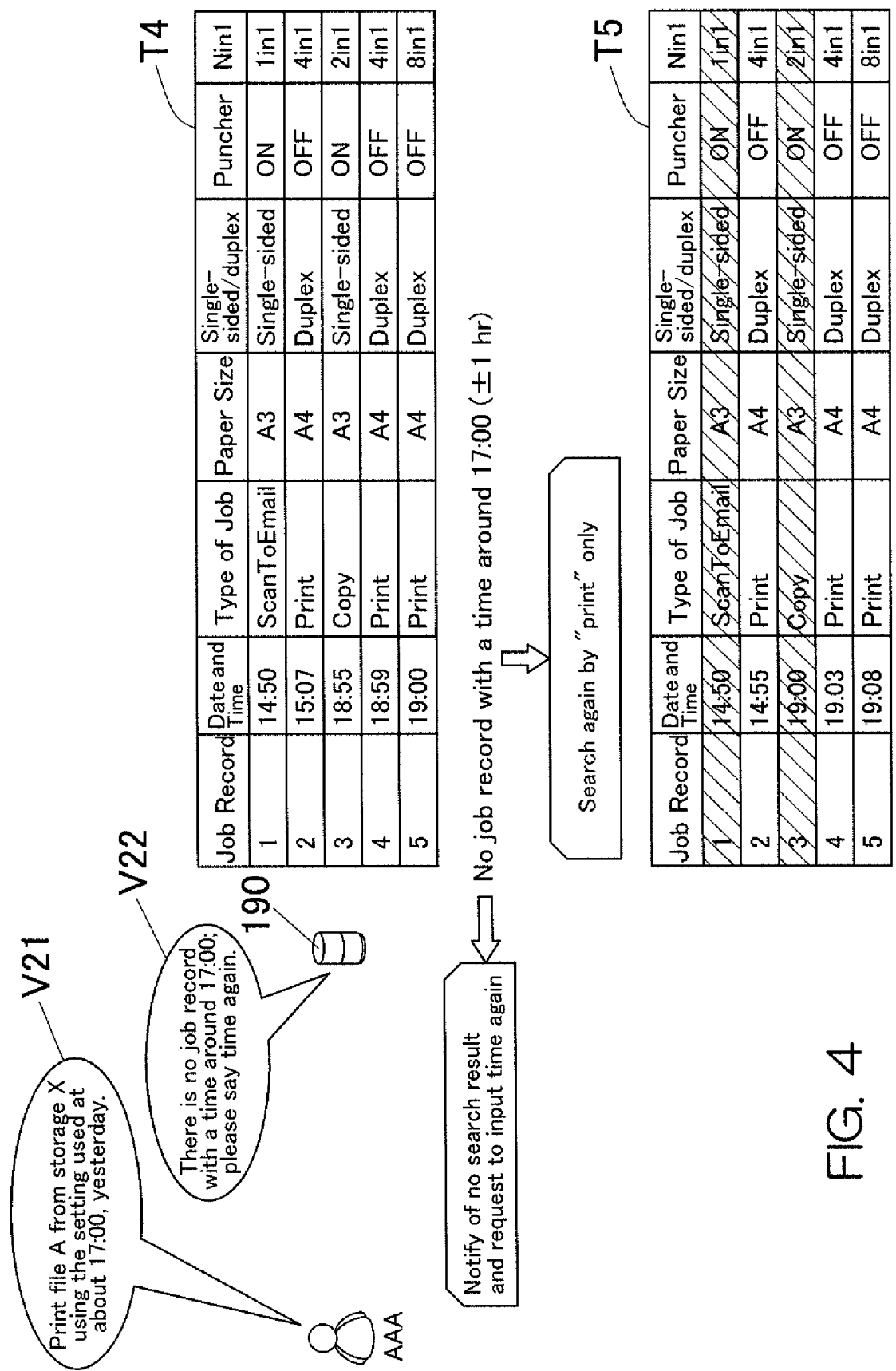
FIG. 4 is a view for reference in describing an example 3 of a job history search operation of the image processing apparatus.

Referring to FIG. 4, the user AAA inputs a speech V21 "print file A from storage X using the setting used at about 17:00, yesterday" in the same manner as he/she does in the concrete example 1. Then the microphone 191 of the speech terminal device 190 converts the user speech input to audio form and transfers it to the controller 100. The controller 100, as instructed by the CPU 101, converts the audio data to text form and extracts keywords from the text. In this example, the controller 100 extracts the keywords "storage X", "file A", "yesterday", "17:00", "at about", "setting", and "print".

Subsequently, the controller 100 searches for a print job record including a date and time around 17:00 (within one hour before and after 17:00), yesterday. The controller 100, however, does not obtain any job record because there is no job record including a time around 17:00, as shown in Table T4 of FIG. 4.

In a first method of saving the situation with no search result, the controller 100 changes the search word condition and conducts the search again. In the example described above, the controller 100 searches a job history by the keywords, "yesterday", "17:00", "at about", and "print". In this example, the MFP 1 searches a job history by the keyword "print" only, for example, and thus obtains the job records No. 2, 4, and 5, as shown in Table T5 of FIG. 4. Subsequently, the controller 100 finds a specific job record in a similar manner to the concrete example 1.

In the manner described above, the controller 100 searches a job history by one of the keywords or a combination of two or more of the keywords. When the controller 100 does not obtain any job record, the controller 100 searches the job history again by another one of the keywords or another combination of two or more of the keywords. The controller 100 is thus allowed to obtain at least one job record.

In a second method of saving the situation with no search result, the controller 100 changes the search word condition by requesting the user to input a speech. The speaker 192 of the speech terminal device 190 outputs a speech for notifying of no search result and requesting to input a speech. For example, as shown in FIG. 4, the speaker 192 outputs a speech V22 "there is no job record with a time around 17:00; please say time again".

Listening to this speech, the user AAA will know the search has failed and input a speech to change the search word condition.

In a third method of saving the situation with no search result, the controller 100 relaxes the search word condition and conducts the search again. In this case, the controller 100 searches for a job record including a time within three hours before and after 17:00, for example, instead of a time within one hour before and after 17:00. Alternatively, the controller 100 searches for a job record including a date of yesterday or the day before yesterday instead of a date of yesterday. The controller 100 is thus allowed to obtain at least one job record.

Concrete Example 4

In this example, the MFP 1 is configured to perform user authentication on the user who intends to start a job by speech, and searches a job history of the authenticated user by keywords.

First of all, the MFP 1 performs user authentication on the user AAA. The MFP 1 may perform user authentication when the user AAA operates the operation panel 130 or when the user AAA inputs a speech, whichever it is.

Figure 5:
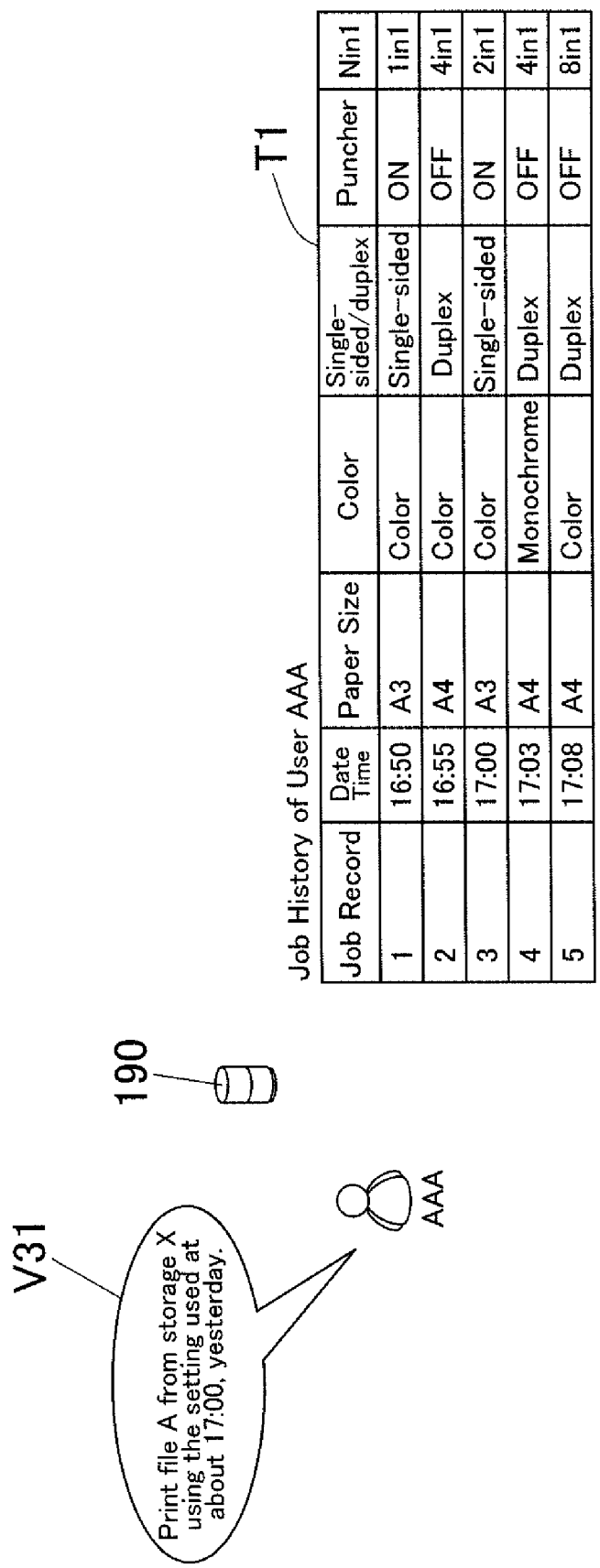
FIG. 5 is a view for reference in describing an example 4 of a job history search operation of the image processing apparatus.

Referring to FIG. 5, after being successfully authenticated, the user AAA inputs a speech V31 "print file A from storage X using the setting used at about 17:00, yesterday". The controller 100 searches a job history of the user AAA by keywords and obtains multiple job records shown in Table T1 of FIG. 5. Job histories are stored on the storage device 110 or an external storage, and each job history is associated with a user who generated jobs. The MFP 1 is allowed to search a different job history depending on the user.

As described above, the MFP 1 searches a job history of an authenticated user only, which makes a job history search quicker.

Concrete Example 5

In this example, a user speech input of an authenticated user includes the name of a different user from the authenticated user, and the MFP 1 is configured to search a job history of the user having that name.

First of all, the MFP 1 performs user authentication on the user AAA. After being successfully authenticated, the user AAA inputs a speech V41 "print file A from storage X using the setting used by Mr. BBB at about 12:00". Then the microphone 191 of the speech terminal device 190 converts the user speech input to audio form and transfers it to the controller 100. The controller 100, as instructed by the CPU 101, converts the audio data to text form and extracts keywords from the text. In this example, the controller 100 extracts the keywords "storage X", "file A", "Mr. BBB", "12:00", "at about", and "print".

Figure 6:
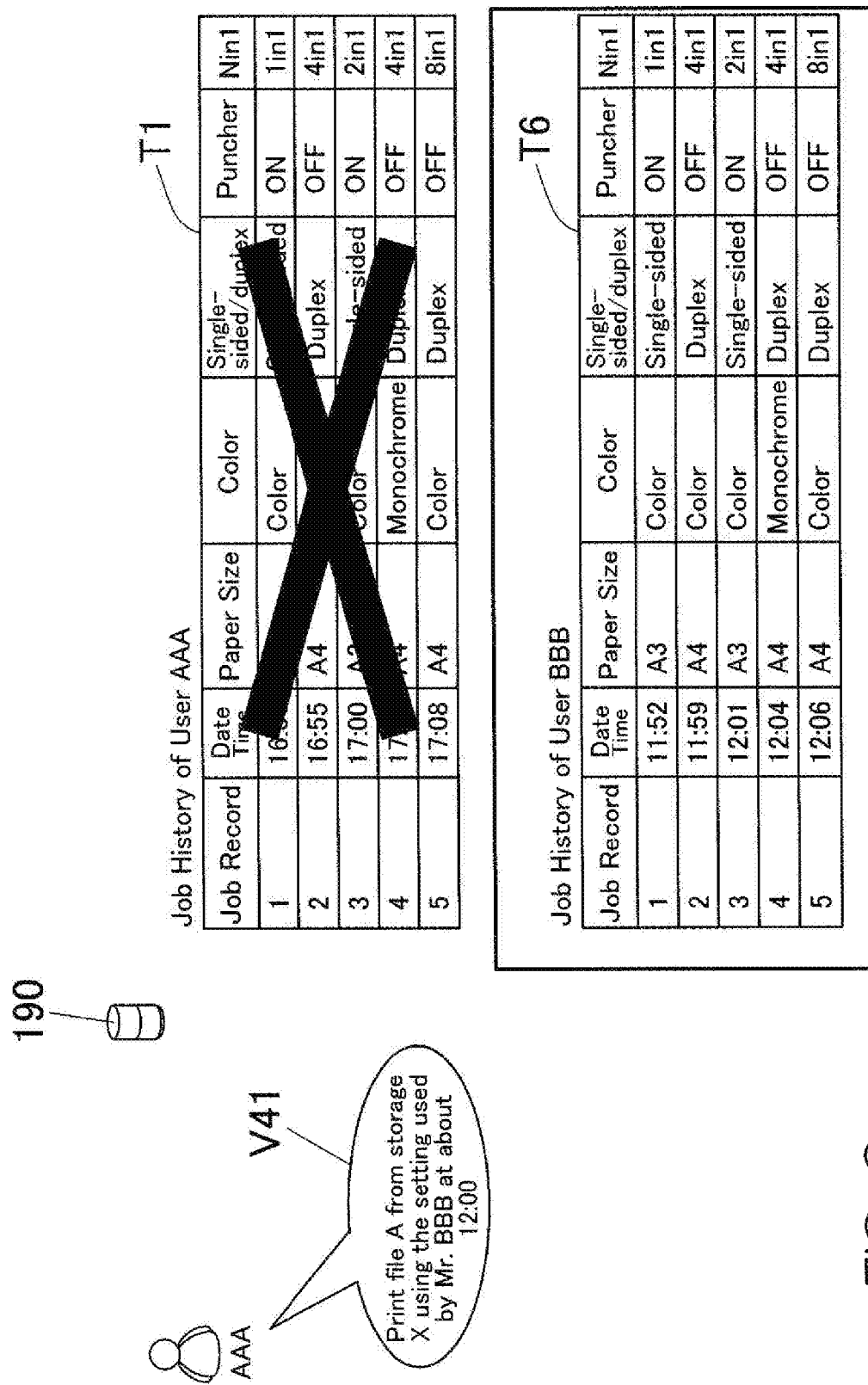
FIG. 6 is a view for reference in describing an example 5 of a job history search operation of the image processing apparatus.

Subsequently, the controller 100 searches a job history of "Mr. BBB", not of the user AAA, by the keywords and obtains multiple job records. In other words, using a user speech input of the user AAA, the controller 100 searches a job history of the user BBB shown in Table T6 of FIG. 6, instead of a job history of the user AAA as shown in Table T1 of FIG. 6.

As described above, when the user AAA inputs a speech including the name of the user BBB, the MFP 1 searches a job history of the user BBB. This allows the user AAA to configure the setting of a job using a job history of the user BBB.

Concrete Example 6

In the concrete example 1, the controller 100 is configured to analyze multiple job records, obtain the number of different values for each function, and request the user to input a target value for the function having the greatest number of different values.

In the concrete example 6, there are multiple functions having the greatest number of different values, and the controller 100 is configured to request the user to input a target value for one of the functions with reference to a priority specified in advance.

For example, the user AAA inputs a speech V51 "print file A from storage X using the setting used at about 17:00, yesterday" in the same manner as he/she does in the concrete example 1. The controller 100 extracts keywords from the user speech input and searches a job history by the keywords. As a result of the search, the controller 100 obtains the job records Nos. 1 to 5 as shown in Table T7 of FIG. 7.

The number of different values for each function is given under Table T7 of FIG. 7. Here in this table, the number of different values both for color and for pages per sheet is four and it is the greatest number among the functions.

Subsequently, the controller 100 determines to request the user AAA to input a target value for one of the two functions with reference to Table T8 of FIG. 7. Table T8 is a priority table that contains priority levels specified in advance about the functions by a privileged user such as an administrator of the MFP 1. Functions with a smaller number are given a higher priority. According to Table T8, pages per sheet with priority 2 is higher in priority than color with priority 3. Thus, the controller 100 determines to request the user to input a target value for pages per sheet. After a speech is selected, the operation is the same as the concrete example 1. The speech terminal device 190 outputs a speech V52 "which was the option for pages per sheet?".

As described above, when there are multiple functions having the greatest number of different values, the MFP 1 requests the user to input a target value for one of the functions with reference to a priority specified in advance.

[Operation of the MFP 1]

Figure 8:
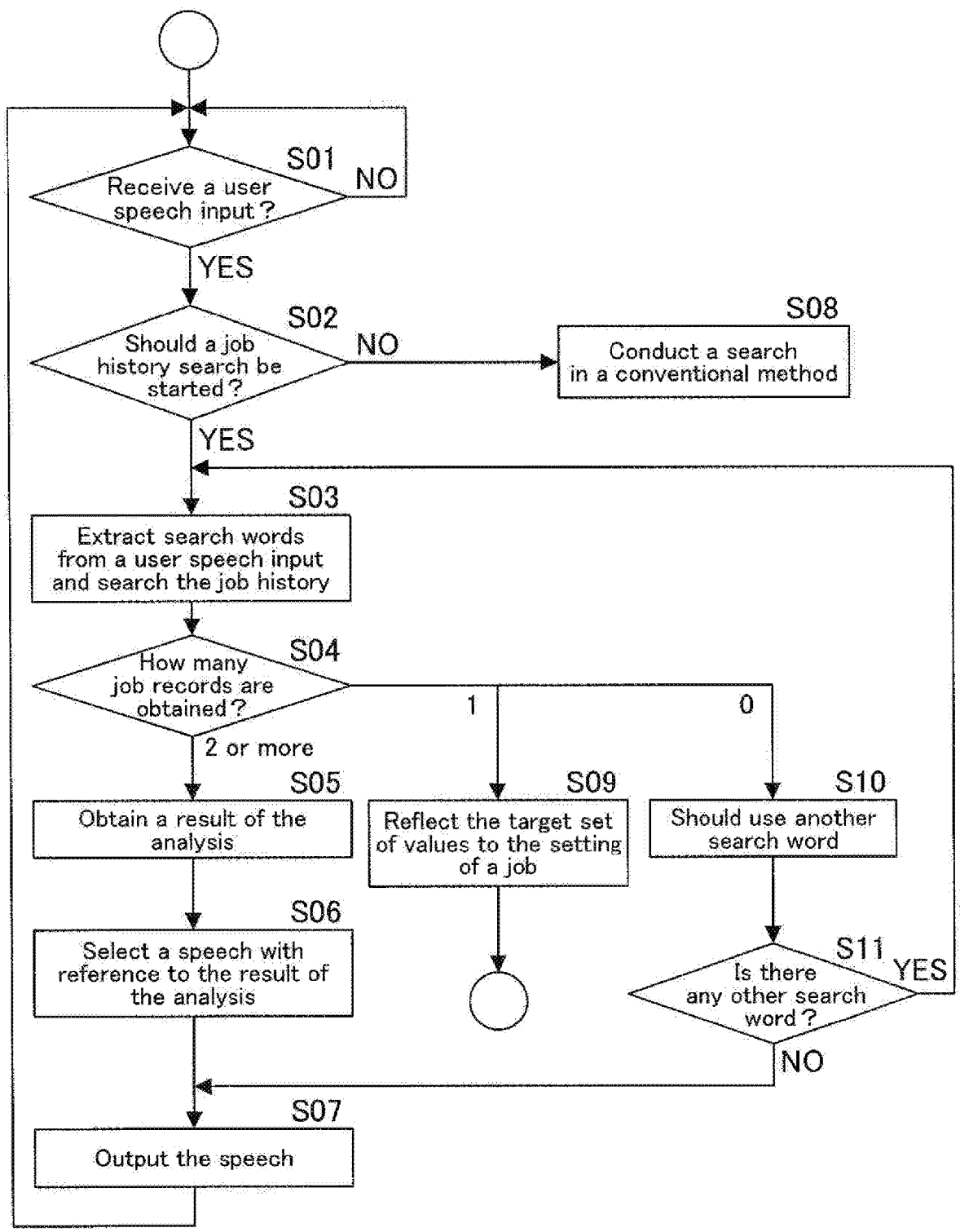
FIG. 8 is a flowchart representing a job history search operation of the image processing apparatus.

The MFP 1 executes a routine to find a specified job record upon the receipt of a user speech input, which will be described with reference to a flowchart of FIG. 8. The routine is executed by the CPU 101 of the controller 100 in accordance with an operation program stored on a recording medium such as the ROM 102.

In Step S01, the routine waits until a user speech input is received (NO in Step S01). When a user speech input is received (YES in Step S01), it is judged in Step S02 whether or not a job history search should be started. Judging whether or not a job history search should be started may be judging whether or not the user speech input includes any keywords such as "yesterday" and "setting". Alternatively, it may be judging whether or not the user speech input includes a predetermined keyword corresponding to a command for starting a job history search.

If a job history search should not be started (NO in Step S02), the routine proceeds to Step S08, in which a job history search is started in a conventional method using a speech. If a job history search should be started (YES in Step S02), the routine proceeds to Step S03, in which search words (keywords) are extracted from the user speech input and the job history is searched by the keywords.

In Step S04, the number of job records obtained by search is counted. If multiple (two or more) job records are obtained by search, the job records are analyzed and a result of the analysis is obtained in Step S05. In Step S06, a speech is selected with reference to the result of the analysis. Then the routine proceeds to Step S07.

In Step S04, if only one job record is obtained by search, a set of values included in the job record is reflected to the setting of a job in Step S09. Then the routine proceeds to Step S07.

In Step S04, if no job record is obtained by search, the search should be conducted again by another keyword or combination of keywords in Step S10. In Step S11, it is judged whether or not there is any other keyword or combination of keywords. If there is another keyword or combination of keywords (YES in Step S11), the routine returns to Step S03, in which the search is conducted again by the keyword or the combination of keywords. The search will be repeated until at least one job record is obtained by search or until there is no other keyword or combination of keywords.

If there is no other keyword or combination of keywords (NO in Step S11), the routine proceeds to Step S07.

In Step S07, the speech is outputted by the speaker 192 of the speech terminal device 190. Then the routine returns to Step S01. Thus, if two or more job records are obtained by search, the search will be repeated until only one job record is obtained by search in Step S04 ("1" in Step S04).

Second Embodiment

In the first embodiment described above, the MFP 1 performs: receiving a user speech input; analyzing a user speech input and extracting keywords; searching a job history; analyzing job records and obtaining a result of the analysis; selecting a speech with reference to the result of the analysis; and outputting the speech.

Figure 9:
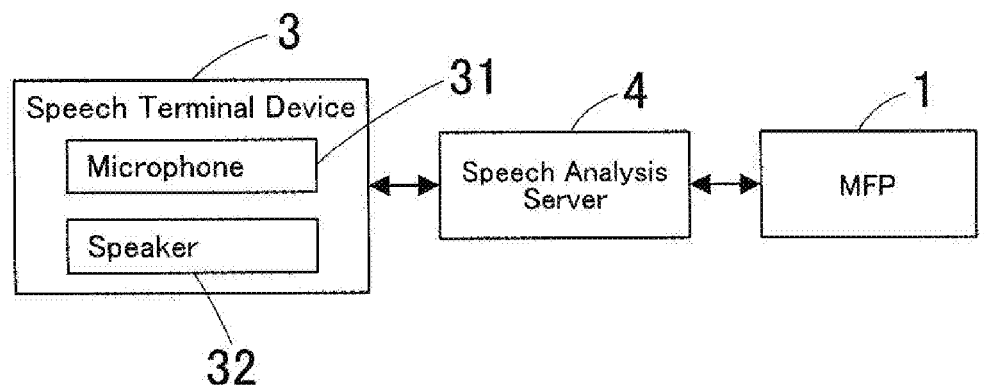
FIG. 9 is an explanatory view of a second embodiment of the present invention.

In the second embodiment, as illustrated in FIG. 9, a speech terminal device 3 is installed outside the MFP 1, and a speech analysis server 4 is located between the MFP 1 and the speech terminal device 3. The speech terminal device 3 and the speech analysis server 4 are allowed to exchange data with each other through the network. Similarly, the MFP 1 and the speech analysis server 4 are allowed to exchange data with each other through the network.

The speech terminal device 3 is provided with: a microphone 31 serving as a speech input device; and a speaker 32 serving as a speech output device (speech generator). The microphone 31 converts a user speech input to audio form and transfers the audio data to the speech analysis server 4. The speaker 32 receives audio data from the speech analysis server 4 and outputs it (generates a speech).

The speech analysis server 4 is comprised of a personal computer. Receiving audio data from the speech terminal device 3, the speech analysis server 4 converts the audio data to text form and extract keywords (search words) from the text. Then the speech analysis server 4 transfers the keywords to the MFP 1.

The MFP 1 receives the keywords from the speech analysis server 4 and searches a job history by the keywords. Obtaining multiple job records by search, the MFP 1 analyzes the job records and obtains a result of the analysis. Then the MFP 1 selects a speech with reference to the result of the analysis and transfers the speech in audio form to the speech analysis server 4. The speech analysis server 4 receives the audio data from the MFP 1 and transfers it to the speech terminal device 3. The speaker 32 of the speech terminal device 3 outputs the audio data.

According to this embodiment, the MFP 1 can have a simplified configuration without the need of analyzing a user speech input and extracting keywords.

The speech analysis server 4 may search a job history by keywords, instead of the MFP 1. In this case, the MFP 1 receives multiple job records from the speech analysis server 4 before performing: analyzing the job records and obtaining a result of the analysis; selecting a speech with reference to the result of the analysis; and transferring it to the speech analysis server 4.

If user authentication is necessary, the MFP 1 or the speech analysis server 4, whichever may perform user authentication.

Third Embodiment

Figure 10:
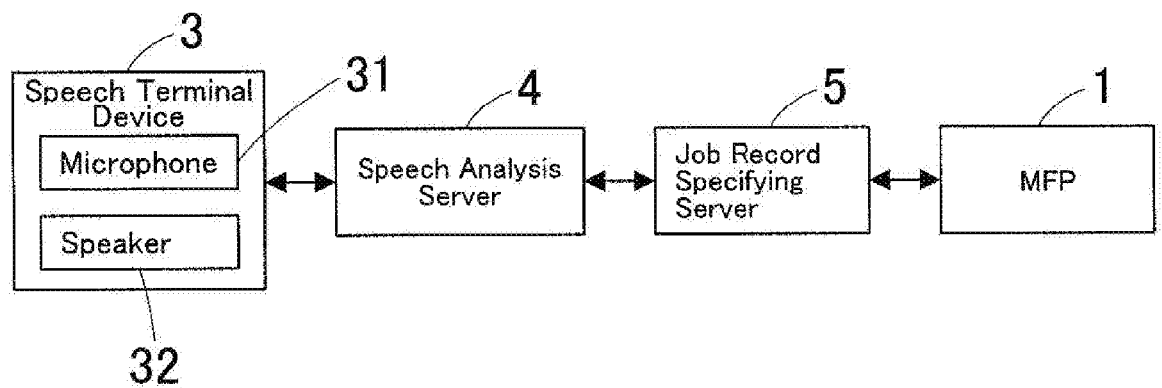
FIG. 10 is an explanatory view of a third embodiment of the present invention.

In the third embodiment, as illustrated in FIG. 10, a speech terminal device 3 is installed outside the MFP 1, and a speech analysis server 4 and a job history search server 5 are located between the MFP 1 and the speech terminal device 3. The job history search server 5 performs: searching a job history; analyzing job records, obtaining a result of the analysis, and selecting a speech with reference to the result of the analysis. The speech terminal device 3 and the speech analysis server 4 are allowed to exchange data with each other through the network. Similarly, the speech analysis server 4 and the job history search server 5 are allowed to exchange data with each other through the network; the job history search server 5 and the MFP 1 are also allowed to exchange data with each other through the network.

The speech terminal device 3 is provided with: a microphone 31 serving as a speech input device; and a speaker 32 serving as a speech output device (speech generator). The microphone 31 converts a user speech input to audio form and transfers the audio data to the speech analysis server 4. The speaker 32 receives audio data from the speech analysis server 4 and outputs it (generates a speech).

Receiving audio data from the speech terminal device 3, the speech analysis server 4 converts the audio data to text form and extracts keywords (search words) from the text. Then the speech analysis server 4 transfers the keywords to a job history search server 5.

Figure 11:
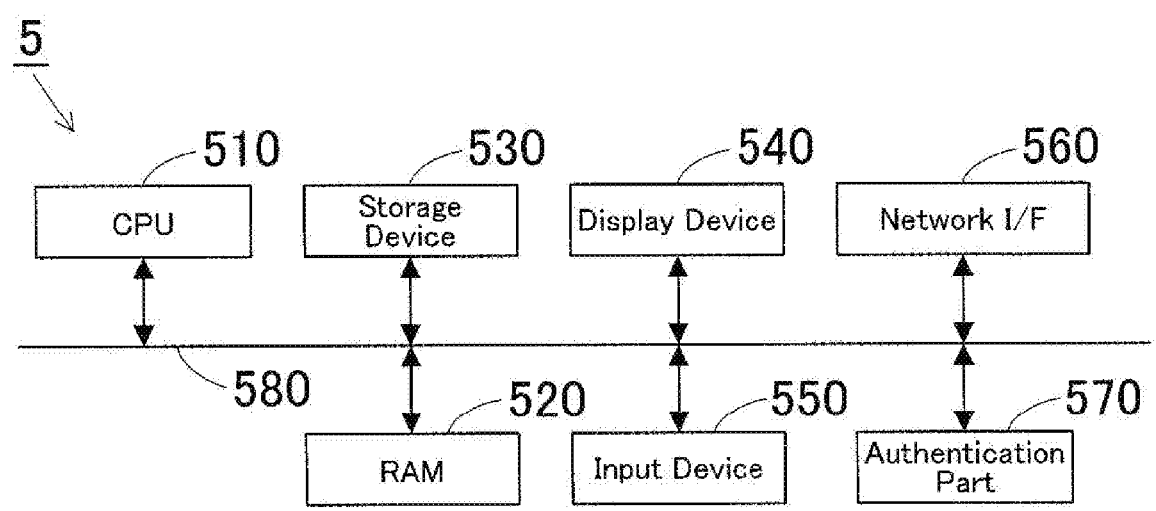
FIG. 11 is a block diagram illustrating a configuration of a job record specifying server.
Figure 12:
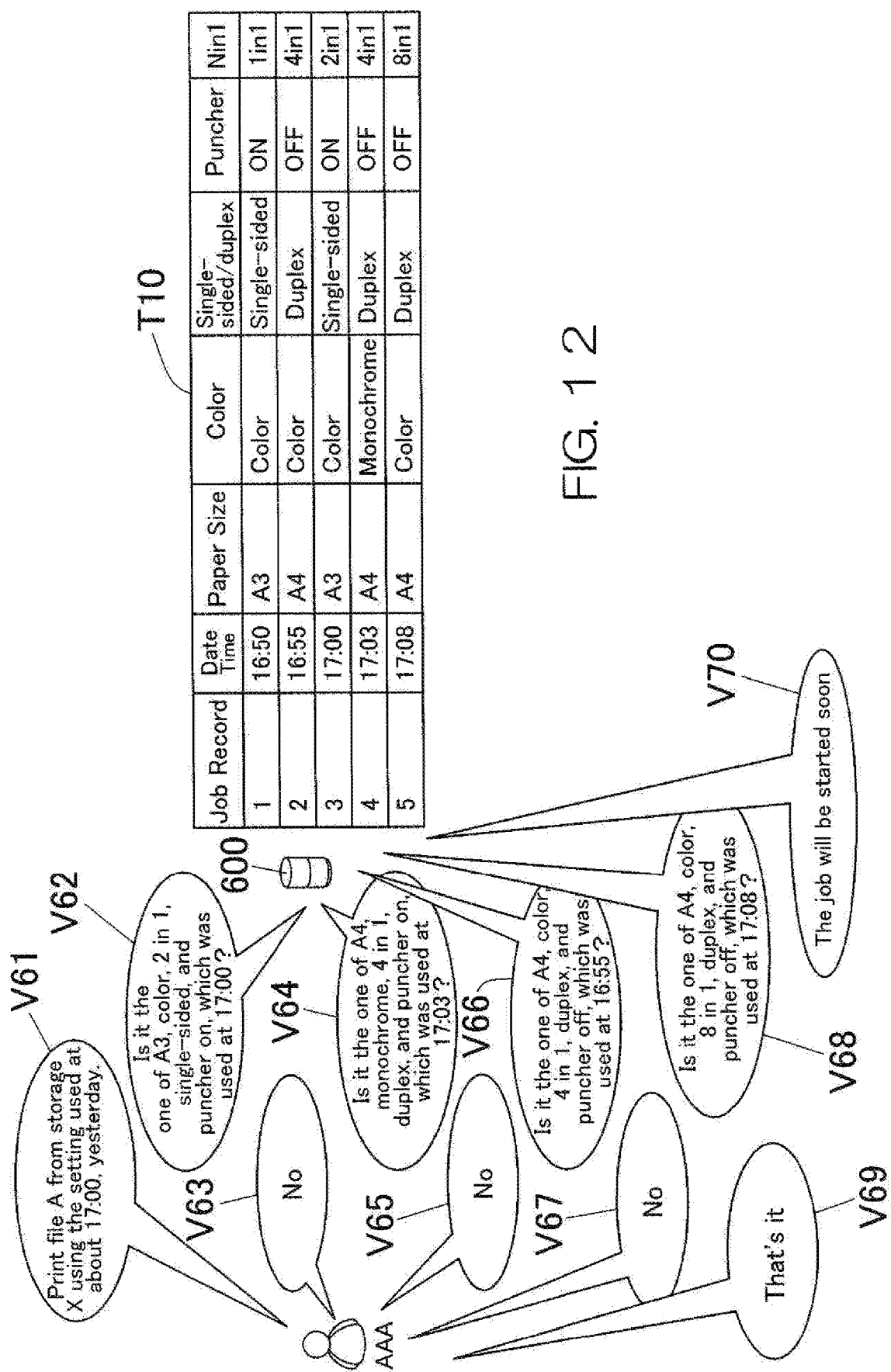
FIG. 12 is a view for reference in describing a conventional method of specifying for a job record.
Figure 13:
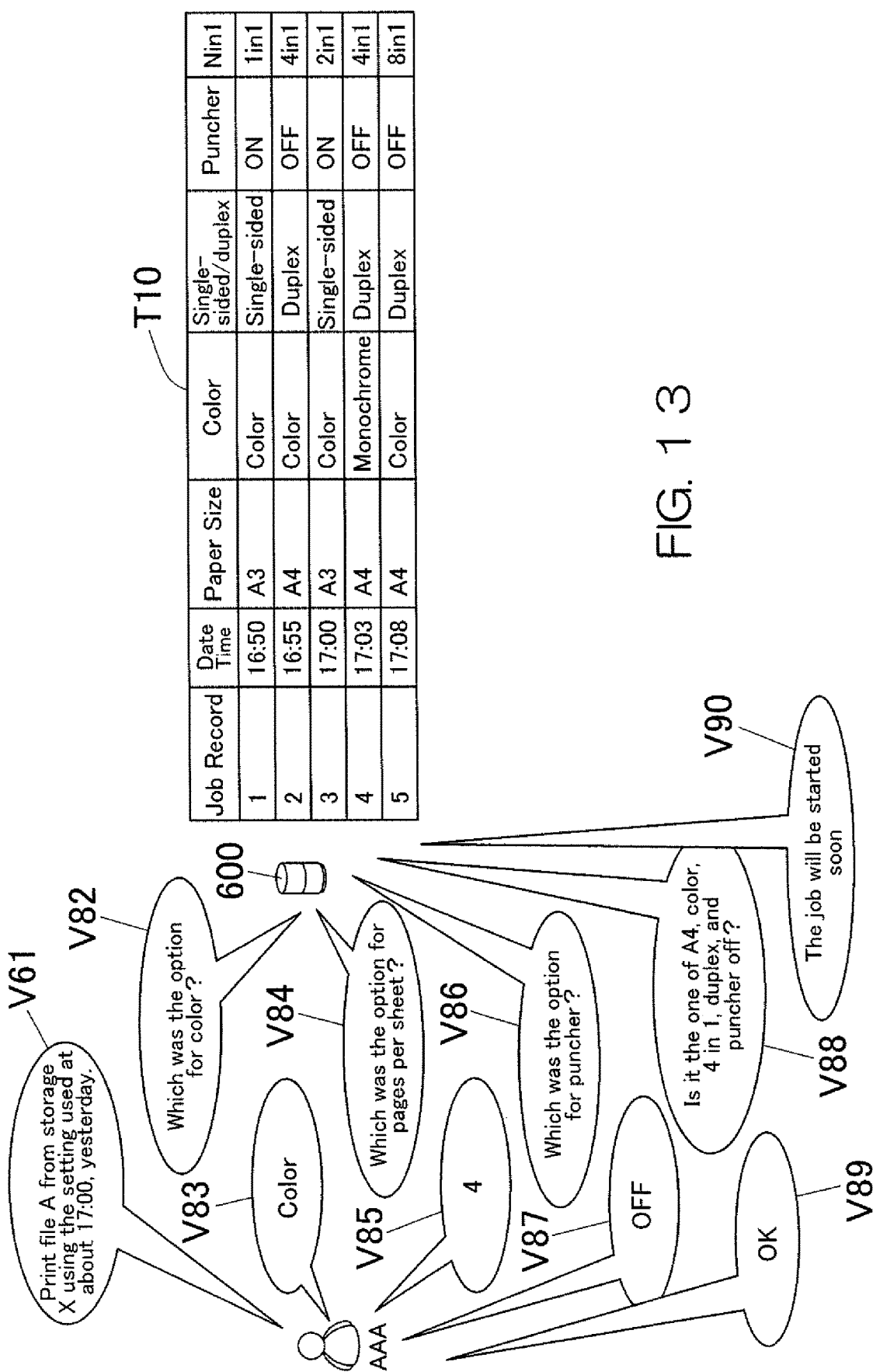
FIG. 13 is a view for reference in describing another conventional method of specifying for a job record.

The job history search server 5 is comprised of a personal computer. As illustrated in FIG. 11, the job history search server 5 is essentially provided with: a CPU 510 that is a processor; a RAM 520; a storage device 530; a display device 540; an input device 550; a network interface (network I/F) 560; and an authentication part 570, all of which are connected to each other through a system bus 580.

The CPU 510 controls the job history search server 5 in a unified and systematic manner by loading the programs stored on a recording medium such as the storage device 530 into the RAM 520 and executing them.

The RAM 520 is a recording medium that provides a workspace for the CPU 510 to operate in accordance with the programs.

The storage device 530 is a recording medium comprised of a hard disk drive, for example, and essentially stores administration data of various types and applications. In particular, in this embodiment, the storage device 530 further receives a job record from the MFP 1 upon completion of an execution of a job, and thus accumulates such job records. The storage device 530 further stores proof information for user authentication.

The display device 540 is comprised of a liquid-crystal display, for example, and essentially displays various messages and operation screens.

The input device 550 serves for user input, being essentially provided with a keyboard and a mouse.

The network interface 560 serves as a transmitter-receiver that exchanges data with the speech analysis server 4 and the MFP 1 through the network.

The authentication part 570 performs user authentication using identification information inputted by the user.

In the system illustrated in FIG. 10, the user inputs a speech via the microphone 31 of the speech terminal device 3; the microphone 31 converts the user speech input to audio form and transfers it to the speech analysis server 4. Receiving the audio data from the speech terminal device 3, the speech analysis server 4 converts it to text form and extracts keywords (search words) from the text. Then the speech analysis server 4 transfers the keywords to the job history search server 5.

The job history search server 5, as instructed by the CPU 510, searches a job history by the keywords. Obtaining multiple job records by search, the job history search server 5 analyzes the job records and obtains a result of the analysis. Then the job history search server 5 selects a speech with reference to the result of analysis. These operations are similar to those of the MFP 1 which are described previously in the first embodiment with reference to the flowchart of FIG. 8.

After selecting a speech, the job history search server 5 transfers it in audio form to the speech terminal device 3 by way of the speech analysis server 4. The speaker 32 of the speech terminal device 3 outputs the speech.

Obtaining a specific job record having a target set of values of the user, the job history search server 5 transfers the target set of values to the MFP 1. The MFP 1 receives the target set of values therefrom and reflects it to the setting of a job. The MFP 1 may also receive a target file for the job from the job history search server 5 as well as the target set of values. Alternatively, the MFP 1 may obtain the target file by itself.

In FIG. 10, the speech analysis server 4 and the job history search server 5 are installed in the system separately. Alternatively, these may be integrated in one server.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A job record specifying device configured to accept a speech including a keyword input by a user via a speech input device, the job record specifying device comprising a hardware processor configured to perform:
    searching a job history by the keyword, the job history being stored on a storage, the job history including a job record, the job record including a set of values having ever been used for a job executed by an image processing apparatus;
    conducting an analysis of different values in multiple job records when the multiple job records are obtained by search;
    selecting a speech for narrowing down the search with reference to the different values and transferring the selected speech to a speech generator; and
    finding a specific job record from the multiple job records using another keyword extracted from a speech input by the user via the speech input device in response to the speech outputted by the speech generator, the specific job record including a target set of values of the user,
    wherein the image processing apparatus uses the target set of values for setting of a job, the target set of values being included in the specific job record.

2. The job record specifying device according to claim 1, further comprising the storage.

3. The job record specifying device according to claim 1, wherein the storage is installed outside the job record specifying device.

4. The job record specifying device according to claim 1, wherein the hardware processor transfers the selected speech to the speech generator by way of a server, the server being capable of exchanging data with the job record specifying device and extracting a keyword by analyzing audio data received from the speech input device.

5. The job record specifying device according to claim 1, further comprising the speech input device and the speech generator.

6. The job record specifying device according to claim 1, wherein, when the multiple job records include an identical set of values as a result of the analysis, the hardware processor does not select a speech and the image processing apparatus uses the set of values for setting of a job, the set of values being included in the multiple job records.

7. The job record specifying device according to claim 1, wherein:
    the analysis finds the number of different values for each function; and
    the hardware processor selects a speech for requesting the user to input a target value for a function having the greatest number of different values.

8. The job record specifying device according to claim 7, wherein:
    there are multiple functions having the greatest number of different values; and
    the hardware processor selects a speech for requesting the user to input a target value for one of the multiple functions, with reference to a priority specified in advance.

9. The job record specifying device according to claim 1, wherein:
    the result of the analysis is a value allowing a unique definition of a specific job record; and
    the hardware processor selects a speech for asking the user whether the value allowing a unique definition of a specific job record is a target value.

10. The job record specifying device according to claim 1, wherein:
    the user inputs a speech including multiple keywords via the speech input device;
    the hardware processor searches a job history by one of the multiple keywords or a combination of two or more of the multiple keywords; and
    when the hardware processor does not obtain any job record, the hardware processor searches the job history again by another one of the multiple keywords or another combination of two or more of the multiple keywords.

11. The job record specifying device according to claim 1, wherein, when the hardware processor does not obtain any job record, the hardware processor selects a speech for notifying of no search result and requesting to input a speech, and the speech generator outputs the speech selected by the hardware processor.

12. The job record specifying device according to claim 1, wherein, when the hardware processor does not obtain any job record, the hardware processor changes the search word condition and searches the job history again.

13. The job record specifying device according to claim 1, wherein:
   authentication on the user is performed and the user is successfully authenticated; and
   the hardware processor searches a job history of the authenticated user by the keyword.

14. The job record specifying device according to claim 13, wherein:
   the authenticated user inputs a speech including the name of a different user from the authenticated user; and
   the hardware processor searches a job history of the different user by the keyword.

15. An image processing apparatus comprising the job record specifying device according to claim 1.

16. A server comprising the job record specifying device according to claim 1.

17. A job record specifying method wherein a user inputs a speech including a keyword via a speech input device, the job record specifying method comprising:
   searching a job history by the keyword, the job history being stored on a storage, the job history including a job record, the job record including a set of values having ever been used for a job executed by an image processing apparatus;
   conducting an analysis on different values in multiple job records when the multiple job records are obtained by search;
   selecting a speech for narrowing down the search with reference to the different values and transferring the selected speech to a speech generator; and
   finding a specific job record from the multiple job records using a keyword extracted from a speech being inputted by the user via the speech input device in response to the speech outputted by the speech generator, the specific job record including a target set of values of the user,
   wherein the image processing apparatus reflects the target set of values to the setting of a job, the target set of values being included in the specific job record.

18. A non-transitory computer-readable recording medium storing a program for an execution by a job record specifying device, wherein
   a user inputs a speech including a keyword via a speech input device; and
   a job history is searched by the keyword, the job history being stored on a storage, the job history including a job record, the job record including a set of values having ever been used for a job executed by an image processing apparatus,
   the program to make a processor of the job record specifying device execute:
   conducting an analysis on different values in multiple job records when the multiple job records are obtained by search;
   selecting a speech for narrowing down the search with reference to the different values and transferring the selected speech to a speech generator; and
   finding a specific job record from the multiple job records using a keyword extracted from a speech being inputted by the user via the speech input device in response to the speech outputted by the speech generator, the specific job record including a target set of values of the user,
   wherein the image processing apparatus reflects the target set of values to the setting of a job, the target set of values being included in the specific job record.

19. A job record specifying device configured to search a job history stored on a storage, the job history including a job record, the job record including a set of values having ever been used for a job executed by an image processing apparatus, the job record specifying device comprising:
   a speech input device configured to accept a speech input by a user; and
   a processor configured to perform:
   when multiple job records are obtained by search, selecting a speech to be output for narrowing down the search with reference to sets of values included in the multiple job records obtained by search; and
   finding a specific job record from the multiple job records obtained by search in accordance with a speech input by a user via the speech input device in response to the output of the selected speech.

20. The job record specifying device according to claim 19, wherein the image processing apparatus uses a target set of values of the user for setting of a job, the target set of values being included in the specific job record found by the processor.

21. The job record specifying device according to claim 19, wherein the processor selects the speech to be output for narrowing down the search with reference to a variation of the sets of values included in the multiple job records obtained by search.

22. The job record specifying device according to claim 19, wherein:
   each job record includes values for multiple functions; and
   the processor selects the speech to be output for narrowing down the search with reference to the number of different values for each function.

23. The job record specifying device according to claim 19, being provided to the image processing apparatus or a server, wherein:
   the storage is a storage available from a service provider; and
   the processor is further configured to find a specific job record from the multiple job records stored on the storage and obtained by search.

24. A device configured to find a specific piece of job information from multiple pieces of job information stored on a storage by outputting a speech for narrowing down the search, the device comprising a processor configured to perform:
   extracting settings for multiple functions from each piece of job information;
   obtaining a number of different settings for each of the functions; and
   selecting a speech connected to one of the functions that was selected from the multiple functions with reference to the obtained numbers.

25. The device according to claim 24, wherein the multiple functions include a color setting function.

26. The device according to claim 24, wherein the multiple functions include a simplex or duplex printing function.

27. The device according to claim 24, wherein the processor selects the speech connected to the function selected from the multiple functions, the selected function having a greatest number of different settings.

* * * * *